No. 843,572. PATENTED FEB. 12, 1907.
A. B. BELLOWS.
WATER SOFTENING PLANT.
APPLICATION FILED DEC. 13, 1904.

4 SHEETS—SHEET 1.

WITNESSES:
INVENTOR

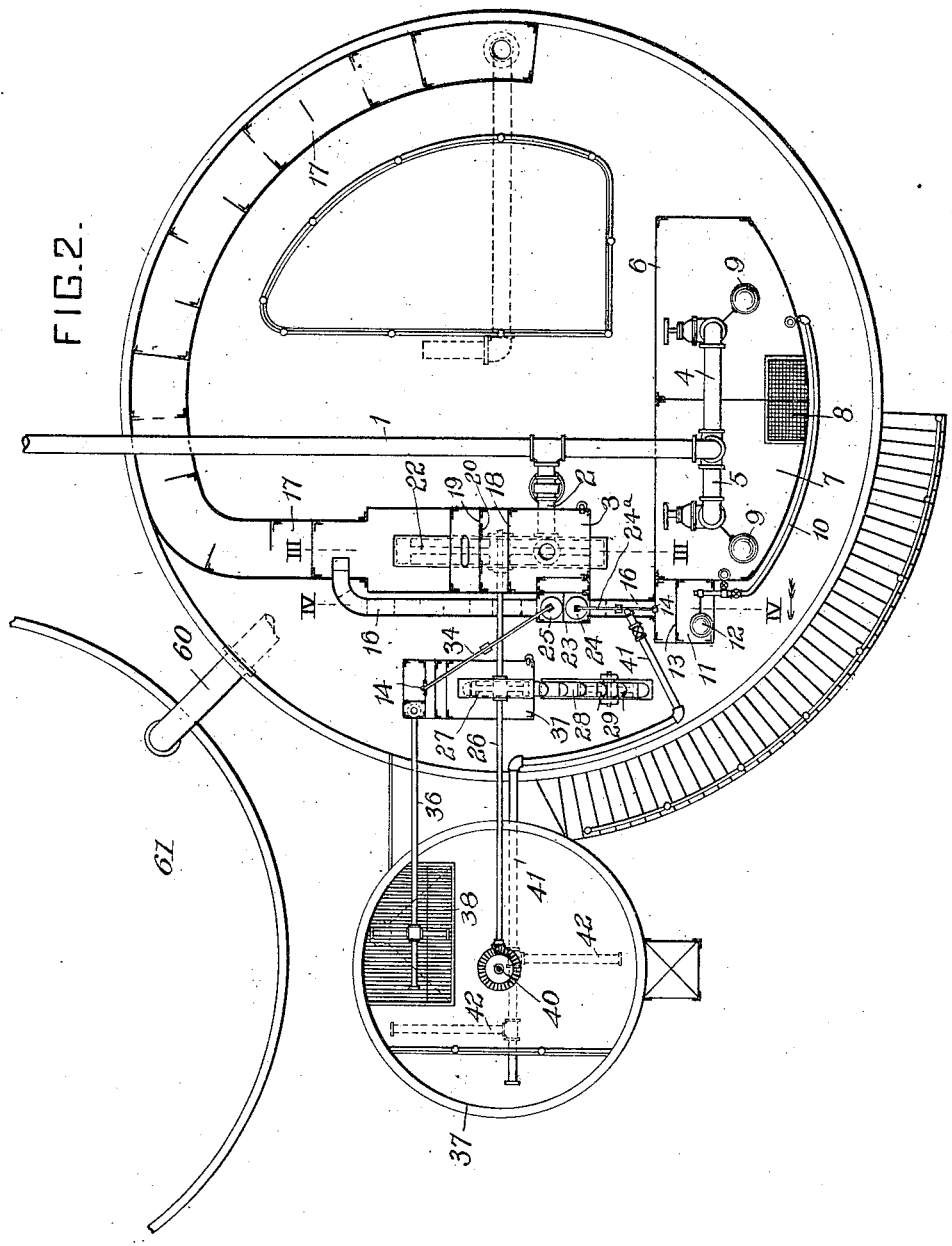

No. 843,572. PATENTED FEB. 12, 1907.
A. B. BELLOWS.
WATER SOFTENING PLANT.
APPLICATION FILED DEC. 13, 1904.
4 SHEETS—SHEET 3.
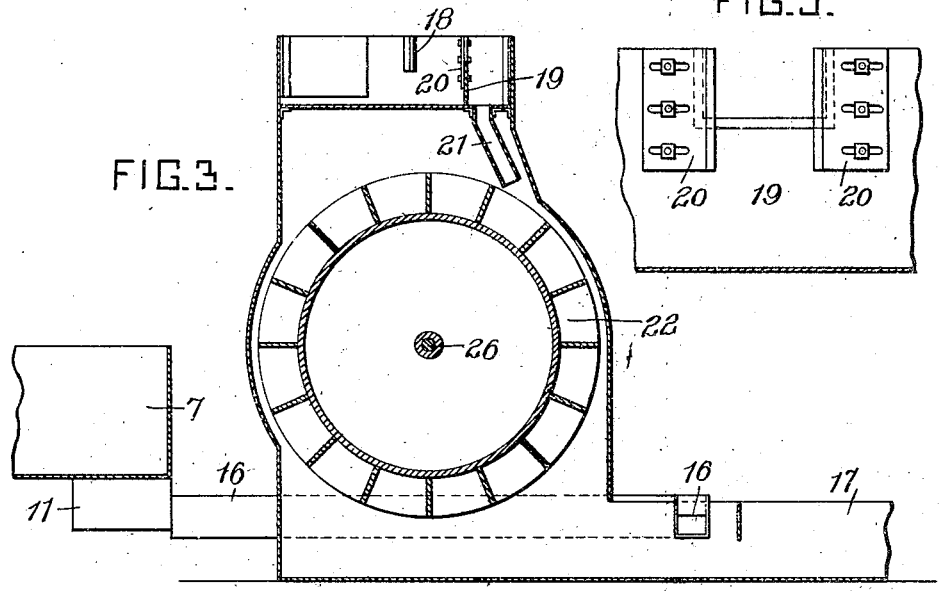
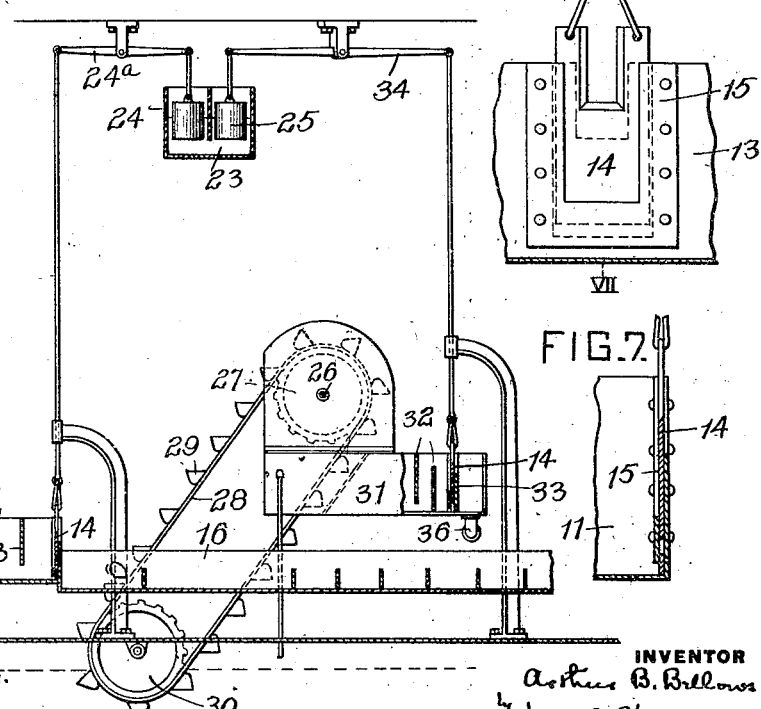
WITNESSES:
INVENTOR
Arthur B. Bellows
Christy & Christy, Atty's No. 843,572. PATENTED FEB. 12, 1907.
A. B. BELLOWS.
WATER SOFTENING PLANT.
APPLICATION FILED DEC. 13, 1904.

4 SHEETS—SHEET 4.

WITNESSES:
Herbert Bradley.
Fred Kirchner.

INVENTOR
Arthur B. Bellows,
by Christy & Christy, Att'ys

UNITED STATES PATENT OFFICE.

ARTHUR B. BELLOWS, OF PITTSBURG, PENNSYLVANIA.

WATER-SOFTENING PLANT.

No. 843,572.   Specification of Letters Patent.   Patented Feb. 12, 1907.

Application filed December 13, 1904. Serial No. 236,733.

*To all whom it may concern:*

Be it known that I, ARTHUR B. BELLOWS, a citizen of the United States, residing at Pittsburg, in the county of Allegheny and State of Pennsylvania, have invented or discovered certain new and useful Improvements in Water-Softening Plants, of which improvements the following is a specification.

The invention described herein relates to certain improvements in a water-softening plant, and has for its object a construction and combination of parts or elements whereby the materials to be added, as lime and soda, may be accurately proportioned to the amount of hard water to be treated.

The invention is hereinafter more fully described and claimed.

Figure 1:
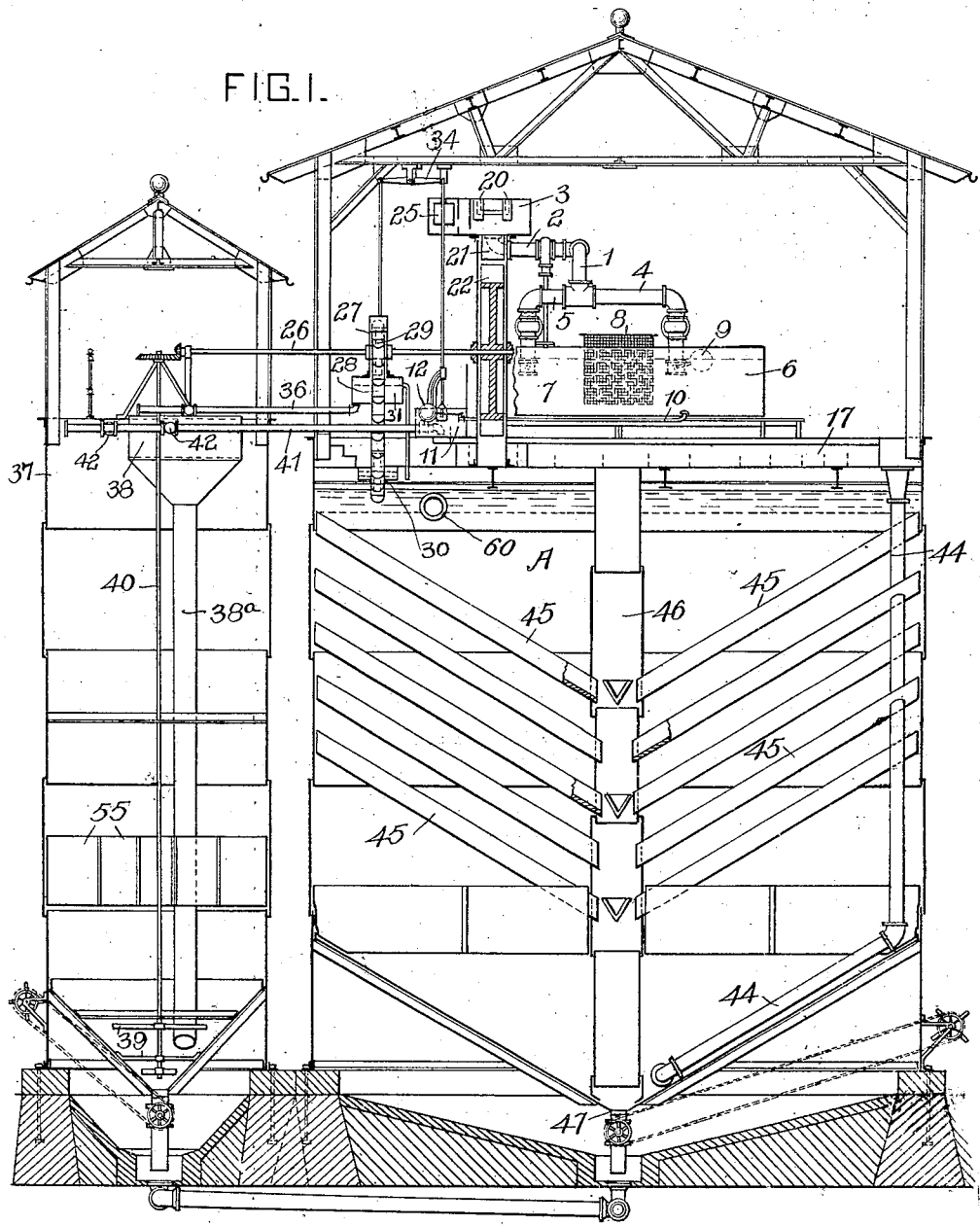
Figure 8:
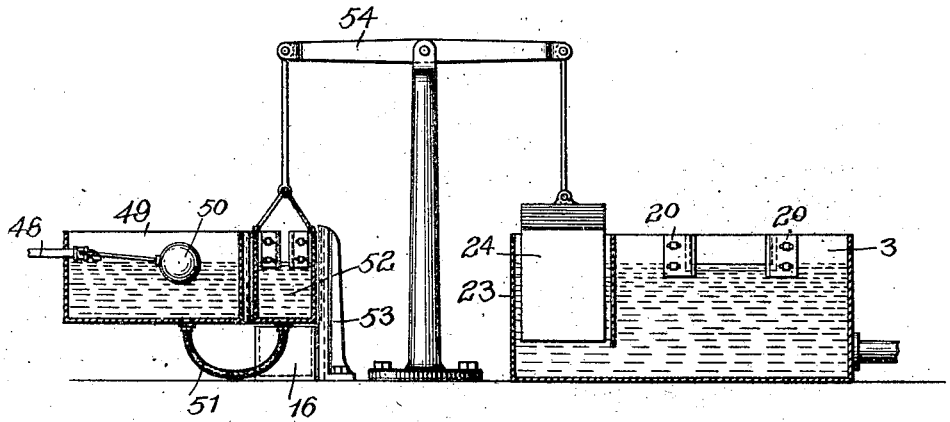
Figure 9:
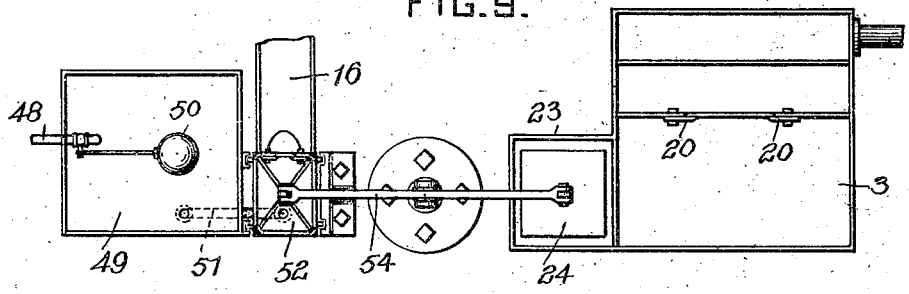

In the accompanying drawings, forming a part of this specification, Figure 1 is a vertical section of my improved plant. Fig. 2 is a top plan view of the same. Fig. 3 is a sectional detailed view, the plane of section being indicated by the line III III, Fig. 2. Fig. 4 is a similar view on the plane indicated by the line IV IV, Fig. 2. Figs. 5 and 6 are detailed views illustrating the constructions of weirs employed in my improved apparatus. Fig. 7 is a sectional view on a plane indicated by the line VII VII, Fig. 6. Fig. 8 is a vertical section of a modification of a part of my improvement, and Fig. 9 is a plan view of the same.

In the practice of my invention the supply-pipe 1 is connected by a valved pipe 2 to an elevated box or chamber 3, the pipe entering the chamber preferably through the bottom. The supply-pipe is also connected by branches 4 and 5 to chambers or receptacles 6 and 7, in which soda is dissolved, the soda being placed in baskets or boxes 8, with perforated walls. A valve mechanism is arranged at the ends of the outlets of pipes 4 and 5, such mechanism being controlled by floats 9, so as to regulate the height of water in the receptacles 6 and 7. Each of the receptacles 6 and 7 is connected by branches to a pipe 10, leading to a weir-box 11, the flow of water into this box being regulated by a valve mechanism controlled by the float 12. Across the weir-box is placed a diaphragm or stilling-plate 13, and in the outlet side of the box is arranged a weir preferably of the construction shown in Figs. 6 and 7. This is formed by vertically notching or slotting an adjustable plate 14, arranged to move in guides 15, formed on opposite sides of a vertical slot formed in the side wall of the box 11. This slide or plate is made of such a length that when moved up it will cover, except for its notched or slotted portion, the vertical slot in the side wall of the box, as clearly shown in Fig. 6. The walls of the notch in the plate 14 are beveled so as to give an accurate determination of liquid flowing through the notch or weir. The liquid flowing through this notch or weir is conducted by a trough 16 to the main discharge-trough 17, as shown in Fig. 2. The water entering the compartment 3 flows under a stilling-plate 18 and through a weir, preferably formed as shown in Fig. 5, consisting of a vertical notch or slot formed in a transverse wall 19, the lateral dimensions of the notch or weir being regulated by adjustable plates 20. After passing through this weir the water flows through a short section of the pipe 21 onto the buckets of a wheel 22, revolving the same and falling into the main trough 17, where the soda-water from the pipes 16 is added thereto.

The box or compartment 3 is in communication with float boxes or chambers 23, in which are arranged floats 24 and 25. The float 24 is connected to one end of the lever 24ª, the opposite end thereof being connected to the slide 14, containing the weir for the soda-water. As the water in the box 23 will remain at the level of the water in the box 3, the level of the latter being determined by the weir in the partition 19, the flow of soda-water from the box 11 will be controlled and regulated by the flow of hard water through the box 3. The wheel 22 is secured on a shaft 26, on which is mounted a belt-wheel 27, around which passes a belt 28, carrying buckets 29. The lower portion of this belt passes around a guide-wheel 30, arranged at such height relative to the water in the receiving-tank A that the buckets will lift purified water from this tank and discharge it into a weir or regulating box or tank 31. As shown in Fig. 4, stilling-plates 32 are arranged transversely of this box in the direction of the flow of water, and in a transverse partition 33 is arranged a weir constructed as described and shown in Fig. 6. The movable plate or slide 14 of this weir is connected to one end of a lever 34, the opposite end of said lever being connected to the float 25, so that the height of the weir edge is determined by the height of water in the receiving box or tank 3. The purified water passing over the weir in partition 33 flows by the pipe 36 to the lime tank or reservoir 37. The lime is placed in a box 38, having a perforated bottom, and the water from the pipe 36 is discharged into this box. The water and lime are carried down by a pipe 38$^a$ and discharged at or near the bottom of the reservoir. The lime and water are thoroughly stirred and mixed together by an agitator consisting of blades 39 on a vertical shaft 40, driven by the shaft 26. Stilling-plates 55 are arranged above the agitator, so that there may not be any movement of the fluid at or near the top of the reservoir and particles of undissolved lime can settle down, leaving the water clear and free from impurities. A pipe 41, having perforated branches 42, is arranged at the normal level of water in the tank or reservoir 37 and is connected to the trough 16, conducting the soda-water to the main trough.

From the foregoing it will be seen that the amounts of soda-water and lime-water flowing into the trough 17 will be regulated and determined by the flow of water through the receiving-chamber 3. The trough 17 is provided along its length with a series of baffle-plates, which will serve to thoroughly mingle the lime and soda water with the hard water, and these mingled waters will flow by a pipe 44 down to the bottom of the main or receiving tank A. It is preferred to arrange within this tank a series of plates or troughs 45, inclined toward and connected to the central discharge-pipe 46, which extends down to the bottom of the tank and in line with the sludge-outlet 47. These troughs will serve to receive the sediment or sludge and discharge it to the central pipe, down which it falls to the point of discharge.

In lieu of arranging the weirs for the soda and lime waters in slides in the side of a box or tank, as described, they may be formed in the side of a movable box, as shown in Figs. 8 and 9. In this construction the water whose flow is to be controlled by the weir is discharged through a valved pipe 48 into a stationary box or tank 49, the inflow of water being controlled by a float 50. This tank is connected by a flexible pipe 51 to a weir-box 52, adapted to be moved up and down relative to the receiving-tank 49. To this end the box is arranged between suitable guides, one of which is preferably formed by the side of tank 49 and the other by a post or standard 53. This box is connected to one end of a lever 54, which has its opposite end connected to a float in box 23, connected, as before stated, to receiving box or tank 3. The weir is formed by slotting or notching one wall of the box 52. As the box is raised or lowered by changes of level of water in tank 3 the position of the horizontal edge of the weir relative to the level of water in the receiving box or tank is correspondingly changed.

While not necessary, a second or storage tank 61 for containing the purified water may be connected with the settling-reservoir or main receiving-tank A by a pipe 60, as shown in Fig. 2. The pipe 60 should be so connected—i. e., adjacent to the upper end of the tank A—so that only clear or purified water will flow into the storage-reservoir.

It is a characteristic of my improvement that the flow of lime and soda is accurately regulated by the adjustment of the weir by and in accordance with changes of flow of water through the receiving-tank 3.

By the term "water mixture" in the claims I mean a mixture of the water to be treated and the treating liquid.

I claim herein as my invention—

1. In water-softening apparatus, a vertically-movable weir having a notch whose edges define the outflowing stream; substantially as described.

2. In water-softening apparatus, a tank having a movable outlet-weir provided with a notch whose edges define the outflowing stream, and connections arranged to automatically move the weir according to the supply of water to be treated; substantially as described.

3. In water-softening apparatus, a stationary tank having a movable weir at one side thereof over which the water flows out of said tank, said weir having a notch whose edges define the outflowing stream; substantially as described.

4. In water-softening apparatus, a stationary tank having a movable weir at one side thereof over which the water flows out of said tank, said weir having a notch whose edges define the outflowing stream, and connections arranged to move the weir vertically proportionately to the supply of water to be treated; substantially as described.

5. In a water-softening plant, the combination of a hard-water-receiving tank, a treating water-supply, a vertically-movable weir controlling the flow of treating liquid and having a notch whose edges define the outflowing stream, and means for shifting the weir by and in accordance with changes of level of water in the receiving-tank; substantially as described.

6. In a water-softening plant, the combination of a hard-water-receiving tank, a shaft operated by the flow of water from said tank, a regulating-tank, means operated by said shaft for raising water to said tank, a vertically-movable weir controlling the flow of liquid from said tank and having a notch whose edges define the outflowing stream, and means for shifting the weir in accordance with the changes of level of water in the hard-water-receiving tank; substantially as described.

7. In a water-softening plant, the combination of a hard-water-receiving tank, a receptacle for receiving water from said tank, a regulating-tank, means operated by the flow of water from the hard-water tank for supplying water to the tank, a reservoir for treating liquids, a vertically-movable weir controlling the flow of water from the regulating-tank to said reservoir and having a notch whose edges define the outflowing stream, means for shifting the weir by and in accordance with changes of level of water in the receiving-tank, an outlet from said reservoir at normal level of water in the reservoir and arranged to discharge into the receptacle; substantially as described.

8. In a water-softening plant the combination of a hard-water-receiving tank, two sources of treating liquid, a receptacle arranged to receive the treating liquid and the water from the receiving-tank, vertically-movable weirs controlling the flow of the treating liquid into said receptacle and having notches whose edges define the outflowing stream, and means for shifting said weirs by and in accordance with the changes of level of water in the receiving-tank; substantially as described.

9. In a water-softening plant, the combination of a hard-water-receiving tank, a receptacle arranged to receive water from said tank, a regulating-tank, means for supplying water to said tank, a reservoir, a vertically-movable weir controlling the flow of water from the regulating-tank to the reservoir and having a notch whose edges define the outflowing stream, means for shifting the weir by and in accordance with the changes of level of water in the receiving-tank, and a connection from the reservoir to the receptacle; substantially as described.

10. In a water-softening plant, the combination of a mixing trough or channel, a supply of hard water and supplies of treating liquids connected to the trough, vertically-movable weirs having notches whose edges define the outflowing streams, and means for regulating the flow of treating liquids from the weirs proportionately to the flow of hard water; substantially as described.

11. In a water-softening plant, the combination of a mixing trough or channel, a supply of hard water connected to the trough or channel, supplies of treating liquids having a common connection to the trough or channel, and vertically-movable weirs for regulating the flow of treating liquids proportionately to the flow of hard water, said weirs having notches whose edges define the outflowing stream; substantially as described.

12. In water-softening apparatus, a treating-tank having a supply-pipe leading to near its bottom and connected to a supply of water mixture, said pipe being arranged to cause a swirl in the water in the lower part of the tank, a water-outlet near the top of the tank for treating the water, and a stilling device between the level of the water-outlet and the end of the entering-pipe; substantially as described.

13. In water-softening apparatus, a treating-tank having a supply-pipe leading to near its bottom and connected with a supply of water mixture, said pipe being curved in its lower portion to cause a swirl in the contained water in the lower part of the tank, a water-outlet near the top of the tank for the treated water, and stilling-plates between the level of the water-outlet and the end of the entering-pipe; substantially as described.

14. In a water-softening plant the combination of a mixing trough or channel, a supply of hard water and one or more supplies of treating liquids connected to the trough or channel, a reservoir and pipe extending from the trough or channel to or approximately to the bottom of the reservoir, stilling-plates arranged in the reservoir above the point of discharge of water into the reservoir, a central tube or pipe extending to or approximately to the bottom of the reservoir, and inclined troughs having their inner or lower ends connected to the central tube or pipe; substantially as described.

In testimony whereof I have hereunto set my hand.

ARTHUR B. BELLOWS.

Witnesses:
CHARLES BARNETT,
HERBERT BRADLEY.